United States Patent [19]

Muller

[11] 4,097,412
[45] Jun. 27, 1978

[54] CATALYST CARRIERS AND A PROCESS FOR THEIR PREPARATION

[75] Inventor: Alain Muller, Le Havre, France

[73] Assignee: Compagnie Francaise de Raffinage, Paris, France

[21] Appl. No.: 748,302

[22] Filed: Dec. 7, 1976

[30] Foreign Application Priority Data

Dec. 8, 1975  France .................................. 75 37506

[51] Int. Cl.$^2$ ........................ B01J 21/04; B01J 23/28; B01J 23/30; B01J 23/74
[52] U.S. Cl. .................................. 252/465; 252/466 J
[58] Field of Search ............................. 252/465, 466 J

[56] References Cited

U.S. PATENT DOCUMENTS

| 2,807,593 | 9/1957 | Dobres | 252/465 |
| 2,878,193 | 3/1959 | Scott | 252/465 |
| 3,227,646 | 1/1966 | Jacobson et al. | 208/254 H |
| 3,227,661 | 1/1966 | Jacobson et al. | 252/466 J |
| 3,480,684 | 11/1969 | Hansford | 252/465 X |
| 3,988,263 | 10/1976 | Hansford | 252/466 J |

Primary Examiner—W. J. Shine
Attorney, Agent, or Firm—Curtis, Morris & Safford

[57] ABSTRACT

Catalyst carriers being an intimate mixture of aluminum oxide and at least one oxide of a second metal from groups VIb and VIII of the periodic table of the elements; preparation process of said carriers by coprecipitation in the form of a gel from aqueous and/or organic solutions of aluminum and the second metal, followed by drying and calcination; and the use of these carriers in the making of catalysts, particularly for the conversion of hydrocarbon charges or desulfurization thereof.

54 Claims, No Drawings

CATALYST CARRIERS AND A PROCESS FOR THEIR PREPARATION

The present invention relates to new catalyst carriers. It further relates to a process of preparation of these carriers and to their use in the making of catalysts for the conversion of hydrocarbon charges.

It is known that the petroleum, petrochemical and chemical industries are increasingly employing processes using catalysts designed to facilitate the desired conversions. These catalysts are combinations of elements such as metals and of carriers well known to the person skilled in the art. In the petroleum industry, for example, alumina, silica and aluminosilicate carriers are widely used. On these have been deposited so-called active phases containing noble metals of group VIII or, generally, the metals of groups III to VIII of the periodic table of the elements, along or in combination with one or more other metals. Active phase means the oxides or sulfides of the metals or, generally, compounds of the metals chosen or the metals themselves (in the metallic state).

Among the currently used carriers alumina, particularly, is part of a wide variety of catalysts:

As a very common example, the processes for the hydroreforming of hydrocarbons use catalysts generally containing platinum, alone or in combination with one or more other metals, known as promoters, from groups III to VII, such as tin, lead, germanium, rhenium, etc., which are deposited on the alumina by impregnation with solutions of the salts of these metals. The properties of the aluminas here used generally are as follows: A specific surface comprised between 50 and 350 $m^2/g$, and a pore volume greater than 0.1 cc/g.

Alumina is used also as a carrier for isomerization catalysts which generally contain, in addition to the active phase (comprising a metal such as platinum, possibly in combination with at least one promoter from groups III to VII, for example), a halogen, usually chlorine.

Alumina is widely used also as a carrier in hydrocarbon desulfurization catalysts, the active phases deposited on the carrier then comprising metals such as molybdenum, tungsten, cobalt or nickel. These desulfurization processes are coming into even wider use today because of the increasingly more stringent standards imposed on the refiners with a view to lowering the sulfur content of fuels such as gas oil or the fuel oils to a level compatible with reduced pollution. When they contain sulfur compounds, products which are to be burned will, upon combustion, give off sulfur oxides that are harmful to the environment.

A special effort has therefore been made to develop advantageous desulfurization techniques of good yield and efficiency whose performance is largely dependent on the use of suitable catalytic formulas.

Most often, these are composed of a refractory mineral oxide carrier such as aluminosilicate or an alumina on which active phases such as the aforesaid metals have been deposited.

Thus, U.S. Pat. No. 3,509,044 describes a process for the hydrodesulfurization of a petroleum residue in the presence of a catalyst containing a molybdenum salt (the sulfide or the oxide) and a cobalt or nickel salt (the sulfides or the oxides) deposited on a carrier containing silica or alumina.

British Pat. No. 1,311,473 describes hydrocarbon desulfurization catalysts containing from 4 to 10% molybdenum, from 1 to 5% nickel or cobalt or a mixture thereof, and from 1 to 5% uranium, deposited on alpha-alumina, these percentages being weight percent.

Britich Pat. No. 1,313,005 describes a process for the preparation of a catalyst which consists in impregnating alumina or a silica-alumina mixture with a phosphoric solution of a metal from the molybdenum and tungsten group on the one hand and the nickel and cobalt group on the other hand.

Many other publications might be cited that describe desulfurization catalysts which essentially consist of a carrier formed by alumina or a silica-alumina mixture on which at least one active metal from the group consisting of nickel, cobalt, molybdenum, tungsten and uranium has been deposited by impregnation.

Other carriers are the subject of many studies. For the isomerization reaction of aromatic hydrocarbons in particular, the behavior of natural zeolites, which are later treated by various cation-exchange processes, is under study.

It has been found that the nature of the catalyst carriers has a great influence on the performance of the catalysts prepared with these carriers.

The applicant has now developed a new catalyst carrier which may be combined with active phases containing metallic elements from groups III to VIII of the periodic table to make catalysts which are highly effective, particularly in conversion reactions of hydrocarbon fractions, and more particularly the desulfurization of such fractions.

A first objective of the present invention thus is to propose new catalyst carriers, particularly for catalysts for the conversion of hydrocarbon fractions.

A second objective of the invention is to improve the performance of the processes for conversion of hydrocarbon fractions, and particularly desulfurization, by making use of catalysts comprising carriers perfected in accordance with the invention.

The invention has as a first embodiment carriers for catalysts formed of intimate mixtures of aluminum oxide and at least one oxide of a metal selected from groups VIB and VIII of the periodic table of the elements, hereinafter called second metal.

The invention has as a second embodiment carriers for catalysts formed of intimate mixtures of aluminum oxide and at least one oxide of a metal selected from the group consisting of nickel, molybdenum, tungsten and cobalt.

The invention has a third embodiment a process for the preparation of a catalyst carrier by coprecipitation in the form of a gel from aqueous and/or organic solutions of aluminum and at least one metal from groups VIB and VIII of the periodic table of the elements, said coprecipitation in the form of a gel being followed by drying and possibly calcination of said gel.

A fourth embodiment of the invention is a process for preparation of a catalyst carrier by hydrolysis of an aluminum alcoholate with an aqueous solution of at least one water-soluble salt of at least one metal from groups VIB and VIII of the periodic table of the elements, said hydrolysis being followed by drying and possibly by calcination.

A fifth embodiment of the invention is a process of preparation of a catalyst carrier by hydrolysis of an aluminum alcoholate with an aqueous solution of at least one water-soluble salt of at least one metal selected from the group consisting of molybdenum, cobalt, nickel and tungsten, said hydrolysis being followed by drying and possibly by calcination.

A further embodiment of the invention is the use of the carriers defined above in the making of catalysts, particularly for the conversion of hydrocarbon charges, by combining said carriers with at least one active phase comprising at least one metal from groups III to VIII of the perodic table of the elements.

Additionally, still another embodiment of the invention is the use of the carriers defined above in the making of desulfurization catalysts for hydrocarbon charges by combining said carriers with an active phase comprising at least one metal from the group consisting of nickel, cobalt, molybdenum and tungsten.

The new carriers prepared by the process developed by the applicant have been found to be formed of an intimate mixture of the various elements entering into their composition. Intimate mixture means that the solids obtained exhibit a very good distribution of the alumina and of the second metal in the mass of the carrier, this distribution being better than that obtained by the usual grinding operations.

The proportion of the various constituents of the carrier may vary over a wide range. However, the applicant deems it preferable to limit the weight percent of the oxide of the second metal or of the second metal oxide to 20% and even to about 15% by weight of the alumina, the minimum effective percentage being approximately 0.1 wt. % thus a preferred range is between 0.1 and 20% based on the total mass of the intimate mixture.

The process of preparation of these carriers comprises several steps.

The first of these is coprecipitation in the form of a gel by hydrolysis, for example, of an aluminum alcoholate — such as, aluminum isopropylate or an aluminum butylate — in solution, the concentration thereof varying from 1 to 70% by weight and being preferably about 20% — for example, in a hydrocarbon such as benzene, toluene or heptane — with an aqueous solution of a water-soluble salt of at least one metal from groups VIB and VIII, for example, cobalt, molybdenum, tungsten or nickel, of a concentration comprised between $3 \times 10^{-2}$ and 1 gram atom per liter of solution. Examples of a water-soluble metal salt are the nitrate or the acetate. However, other salts may also be used. The two solutions — the organic solution containing the aluminum alcoholate and the aqueous solution containing the metal salt or salts — are contacted with each other at ordinary temperature or, more generally, at a temperature comprised between 0° and 50° C and then agitated, with a gel then forming. The quantity of water to be used may be from one to three times the stoichiometric quantity for securing precipitation.

The gel obtained is subjected to maturing for a period of greater or less duration which may be as long as one or two days but in no case shorter than 10 minutes, the gel being allowed to stand or being agitated. The solvents are then removed by any means known in the art, such as lyophilization, bakeout, filtration, vacuum evaporation, etc. The applicant has successfully used vaporization under subatmospheric pressure.

A hydrated gel is thus recovered which has the approximate formula $Al_2O_3 \cdot X\, MO \cdot 3H_2O$, where MO represents the oxide of nickel, molybdenum, cobalt or tungsten. When a plurality of aqueous solutions of salts of different metals have been used, a gel of formula $Al_2O_3 \cdot y\, MO + z\, M'O + \ldots \cdot 3H_2O$ is obtained.

This gel may be oven-dried at temperatures comprised between 70° and 140° C, or preferably between 80° and 120° C, then possibly calcined at a temperature ranging from 400° to 700° C.

After calcination, the textural properties of the solid obtained, which forms the carrier in accordance with the invention, are particularly interesting. The carrier has a specific surface of about 500 to 800 $m^2/g$ and a pore volume comprised between approximately 1 and 1.5 cc/g.

The solid obtained, which is finely divided and is formed of the trihydrated or unhydrated organogel (the water of constitution may have been eliminated during calcination), is steeped in an organic solvent such as toluene or heptane or another liquid hydrocarbon. The amounts of solvent to be added are in the neighborhood of the impregnation volume of the solid. The whole is kneaded for homogenization.

The paste obtained is then subjected to peptization with an acid such as nitric acid in solution. Before this operation, the paste may be moistened by the addition of water in amounts which may be as great as 65 or 70 wt. %, based on the weight of the dry gel. The amount of acid necessary for peptization is comprised between 0.5 and 10% and, in general, is less than 5% by weight of the dry gel. The acid, preferably in solution, is added a little at a time, the paste being continuously kneaded.

Kneading is continued until separation of the constituents of the mixture sets in, which liberates the organic solvent. The liquid phase is eliminated and the paste is recovered and subjected, under the usual conditions, to an extrusion or any other mode of forming, such as granulation.

After this mechanical forming, the solid is dried at a temperature comprised between 70° and 140° C, then calcined at a temperature between 400° and 700° C, and preferably between 500° and 600° C.

The solids so obtained are very good catalyst carriers. Their textural properties are about one-half those of the starting solid, their specific surface being comprised between 100 and 500 $m^2/g$ and their pore volume being greater than 0.1 cc/g.

To produce the catalysts, the active phases must then be deposited on these carriers.

For example, to produce hydrodesulfurization catalysts, the active phases to be deposited are the metals of groups VIII and VIB of the periodic table of the elements.

The technique of deposition used by the applicant is impregnation of the carrier with solutions containing the metals, either in anionic or in cationic form, and in whose composition they enter. After impregnation with these solutions, the solid obtained is dried at between 70° and 140° C, then calcined in air at between 400° and 700° C, and preferably between 400° and 600° C.

The percentage of the metals so deposited on the carrier ranges from 1.5 to 20 wt. %, based on the total mass of the catalyst.

The catalytic formulas so obtained are particularly effective in processes for the desulfurization of hydrocarbon fractions, particularly the fractions usually called atmospheric gas oil, fuel oils, or vacuum gas oil.

Before the hydrocarbon desulfurization operation, it may be advantageous to presulfurize these catalysts by prior-art processes. In general, after they have been placed under hydrogen pressure at between 50° and 200° C, the temperature is raised to about 350° to 400° C while compounds susceptible of liberating sulfur, such as mixtures of hydrogen and hydrogen sulfide, mercaptans or carbon sulfide or even a sulfurous gas oil, are passed over the catalyst.

This operation is carried out in the presence of hydrogen. The hydrocarbons to be desulfurized generally are in the liquid phase and the reaction conditions are as follows: The temperature is comprised between 300° and 500° C, the pressure between 30 and 180 bars. The volume ratio between hydrogen and hydrocarbons ranges from 100 to 800 standard liters per liter, and the subspace velocity (vol./vol./hr.) of the charge, measured in the liquid state, is preferably comprised between 1 and 5.

The carriers in accordance with the invention may, of course, be used to make any other type of catalyst for the conversion of hydrocarbon fractions with different active phases comprising, as a rule, at least one metal from groups III to VIII of the periodic table of the elements.

The examples which follow are illustrative of the preparation and properties of the carriers in accordance with the invention. They also relate to the making of catalysts for the conversion of hydrocarbon fractions from said carriers and to the uses of said catalysts. These examples are, of course, in no wise limitative.

EXAMPLE 1

This example illustrates the preparation of carriers in accordance with the invention.

Aluminum isopropylate dissolved in an organic solvent is hydrolyzed, at ambient temperature and with agitation, with an aqueous solution of a water-soluble salt of nickel, tungsten, cobalt or molybdenum.

After precipitation of the gel obtained, the solvent is evaporated at a temperature of about 60° C under subatmospheric pressure.

This removal of the solvent is followed by a moistening of the gel with water and then by peptization with a 1N solution of nitric acid.

After the paste obtained has been kneaded, it is put in the form of extrudates 1.5 mm in diameter, which are then calcined at about 550° C. Table 1 which follows gives the operating parameters of the various steps in the preparation of a dozen carriers, designated A to L. Also presented in that table are, for control purposes, the conditions of preparation of two pure alumina carriers, T1 and T2, prepared under the same conditions, as well as of the two other control carriers, $T_1'$ and $T_2'$, respectively, prepared by hydrolysis of aluminum butylate in place of aluminum isopropylate.

Table 1

| Carrier | ORGANIC SOLUTION | | AQUEOUS SOLUTION | | FORMING | | Constitution of solid obtained after calcination (wt. %) |
|---|---|---|---|---|---|---|---|
| | Weight of aluminum isopropylate or butylate used (grams) | Volume of toluene | Weight and designation of salt used | Weight of water (grams) | Volume of water for moistening in wt. %, based on dry gel | Amount of acid for peptization, in wt. %, based on dry gel | |
| A | 1,386 | 7.98 l | 13.6 g Ni(NO$_3$)$_2$ . 6H$_2$O | 364 | 63.6 | 4 | 99% Al$_2$O$_3$ 1% NiO |
| B | 792 | 4.56 l | 6.64 g Ni(CH$_3$COO)$_2$ . 4H$_2$O | 208.8 | 63.5 | 4 | 99% Al$_2$O$_3$ 1% NiO |
| C | 156.8 | 910 cc | 3.10 g Ni(NO$_3$)$_2$ . 6H$_2$O | 40.8 | 67 | 1 | 98% Al$_2$O$_3$ 2% NiO |
| D | 156.8 | 910 cc | 8.05 g Ni(NO$_3$)$_2$ . 6H$_2$O | 39.8 | 67 | 1 | 95% Al$_2$O$_3$ 5% NiO |
| E | 156.8 | 910 cc | 16.9 g Ni(NO$_3$)$_2$ . 6H$_2$O | 37 | 69 | 1 | 90% Al$_2$O$_3$ 10% NiO |
| F | 300 | 1.72 l | 0.33 g ammonium paratungstate | 79.5 | 64.5 | 1 | 99.6% Al$_2$O$_3$ 0.4% WO$_3$ |
| G | 300 | 1.72 l | 0.83 g ammonium paratungstate | 79.5 | 75.5 | 1 | 99% Al$_2$O$_3$ 1% WO$_3$ |
| H | 238 | 1.37 l | 2.34 g hexahydrated cobalt nitrate | 62.4 | 63.5 | 1 | 99% Al$_2$O$_3$ 1% CoO |
| I | 235 | 1.35 l | 4.8 g hexahydrated cobalt nitrate | 61.2 | 63.5 | 1 | 98% Al$_2$O$_3$ 2% CoO |
| J | 238 | 1.37 l | 0.736 g tetrahydrated ammonium paramolybdate | 63.3 | 65.1 | 1 | 99% Al$_2$O$_3$ 1% MoO$_3$ |
| K | 235 | 1.35 l | 1.476 g tetrahydrated ammonium paramolybdate | 63 | 63 | 1 | 98% Al$_2$O$_3$ 2% MoO$_3$ |
| L | 228 | 1.31 l | 3.69 g tetrahydrated ammonium paramolybdate | 61.8 | 63 | 1 | 95% Al$_2$O$_3$ 5% MoO$_3$ |
| T1 | 156.8 | 910 cc | — | 41.6 | 62 | 0.5 | 100% Al$_2$O$_3$ |
| T2 | 156.8 | 910 cc | — | 41.6 | 62 | 1 | 100% Al$_2$O$_3$ |
| $T_1'$ | 194.4 | 400 cc | — | 65 | 62 | 1 | 100% Al$_2$O$_3$ |
| $T_2'$ | 194.4 | 400 cc | — | 65 | 62 | 1 | 100% Al$_2$O$_3$ |

Table 2 which follows gives the textural properties (specific surface As, pore volume Vp, and average pore radius r̄) of some of the solids obtained, before being formed (gel) and/or after being formed (extrudates).

EXAMPLE 2

This example illustrates the preparation of catalysts with the aid of the carriers prepared in Example 1 and the use of said catalysts in desulfurization.

(A) PREPARATION OF CATALYSTS

The carriers A, B, F, G, H, I, J, L and $T_1'$, granulated to 0.5 and 1 mm, are made to undergo an impregnation with a solution of hexahydrated cobalt nitrate and tetrahydrated ammonium paramolybdate in a rotary evaporator in such quantity that the weight percent of oxides of cobalt, CoO, and of molybdenum, $MoO_3$, determined after calcination of the solid obtained, are 2.5% and 17%, respectively, based on the total weight of the catalyst.

The carriers C, D, E, T1, T2 and $T_2'$ are granulated to 0.5 to 1 mm, then subjected to impregnation in a rotary evaporator with an aqueous solution of hexahydrated cobalt nitrate and tetrahydrated ammonium paramolybdate in such quantity that the cobalt- and molybdenum-oxides contents of the catalyst finally obtained are 3% and 13.5%, respectively.

A portion of the carrier K (herinafter designated $K_1$) is treated in a similar manner as carrier A while another portion of the carrier K (hereinafter designated $K_2$) is treated in the same manner as carrier C.

The compositions of the catalysts so obtained are given in Table 3 which follows.

Table 2

| Carrier | Before Forming | | | After Forming | | |
|---|---|---|---|---|---|---|
| | As ($m^2$/g) | Vp (cc/g) | r̄ (Å) | As ($m^2$/g) | Vp (cc/g) | r̄ (Å) |
| A | 572 | 1.07 | 37 | 273 | 0.50 | 37 |
| B | 542 | 1.2 | 44 | 280 | 0.58 | 42 |
| C | 573 | 1.12 | 39 | 268 | 0.46 | 38 |
| D | 585 | 1.12 | 38 | 269 | 0.42 | 31 |
| E | 560 | 0.75 | 27 | 253 | 0.36 | 28 |
| H | — | — | — | 284 | 0.55 | 39 |
| I | — | — | — | 278 | 0.48 | 35 |
| J | — | — | — | 290 | 0.57 | 39 |
| T1 | — | — | — | 310 | 0.66 | 43 |
| T2 | — | — | — | 343 | 0.64 | 37 |
| $T_1'$ | — | — | — | 277 | 0.72 | 52 |
| $T_2'$ | — | — | — | 276 | 0.75 | 54 |

Table 3

| Catalyst | Carrier | | Active phase (wt. %, based on total weight) | |
|---|---|---|---|---|
| | $Al_2O_3$ (%) | Second metal (%) | CoO | $MoO_3$ |
| A | 99 | 1 (NiO) | 2.5 | 17 |
| B | 99 | 1 (NiO) | 2.5 | 17 |
| C | 98 | 2 (NiO) | 3 | 13.5 |
| D | 95 | 5 (NiO) | 3 | 13.5 |
| E | 90 | 10 (NiO) | 3 | 13.5 |
| F | 99.6 | 0.4 ($WO_3$) | 2.5 | 17 |
| G | 99 | 1 ($WO_3$) | 2.5 | 17 |
| H | 99 | 1 (CoO) | 2.5 | 17 |
| I | 98 | 2 (CoO) | 2.5 | 17 |
| J | 99 | 1 ($MoO_3$) | 2.5 | 17 |
| $K_1$ | 98 | 2 ($MoO_3$) | 2.5 | 17 |
| $K_2$ | 98 | 2 ($MoO_3$) | 3 | 13.5 |
| L | 95 | 5 ($MoO_3$) | 2.5 | 17 |
| $T_1$ | 100 | — | 3 | 13.5 |
| $T_2$ | 100 | — | 3 | 13.5 |
| $T_1'$ | 100 | — | 2.5 | 17 |
| $T_2'$ | 100 | — | 3 | 13 |

(B) CATALYTIC HYDRODESULFURIZATION TESTS

The catalysts whose modes of preparation have been described above are subjected to hydrodesulfurization tests with two types of hydrocarbon charges, namely, a gas oil (GO) and a vacuum distillate (VGO).

The origin of the gas oil is Iraq, its gravity at 15° C is $d = 0.8385$, its distillation range 219° to 355° C, and its sulfur content, 1%.

The vacuum distillate is from a "Safaniya" petroleum. Its characteristics are as follows:
Gravity at 15° C: 0.918
Viscosity (210° F = 99° C): 6.17 cst
CONRADSON carbon: 0.25
Average molecular mass: 380
Sulfur content: 2.83%
Distillation range: 281° to 510° C (50% distilled point: 444° C)

A 10 cc reactor is filled with catalyst, which is presulfurized by means of the gas oil described above at 375° C for 5 hr. The operating conditions of the tests are as follows:

Table 4

| Charge | Hydrogen pressure (bars) | $H_2$/hydrocarbon ratio | Temp. | Space velocity |
|---|---|---|---|---|
| GO | 30 | 180 standard liters per liter of charge | 375° C | 5 |
| VGO | 30 | 670 standard liters per liter of charge | 300, 325 350, 375° C | 3 |

The results of the tests may be evaluated on the basis of the final sulfur content of the hydrocarbon charge. These results are given in Table 5.

Table 5

| Catalyst | GO charge 375° C Final sulfur % | VGO charge Final sulfur, wt. % | | | |
|---|---|---|---|---|---|
| | | 300° C | 325° C | 350° C | 375° C |
| A | 0.05 | 1.94 | 1.27 | 0.76 | 0.28 |
| B | 0.034 | 1.83 | 1.26 | 0.75 | 0.25 |
| C | 0.03 | — | — | — | 0.30 |
| D | 0.05 | — | — | — | 0.33 |
| E | 0.06 | — | — | — | 0.48 |
| F | 0.05 | 1.82 | 1.32 | 0.79 | 0.35 |
| G | 0.05 | 1.89 | 1.34 | 0.81 | 0.32 |
| H | 0.04 | 1.74 | 1.26 | 0.80 | 0.31 |
| I | 0.03 | 1.80 | 1.20 | 0.72 | 0.28 |
| J | 0.04 | 1.90 | 1.29 | 0.79 | 0.35 |
| $K_1$ | 0.04 | 1.97 | 1.34 | 0.71 | 0.28 |
| $K_2$ | 0.05 | 2.00 | 1.33 | 0.79 | 0.31 |
| L | 0.03 | 1.89 | 1.31 | 0.74 | 0.27 |
| T1 | 0.09 | — | — | — | 0.57 |
| T2 | 0.08 | — | — | — | 0.50 |
| $T_1'$ | 0.15 | 2.28 | 1.56 | 1.18 | 0.49 |
| $T_2'$ | 0.09 | 2.51 | 1.72 | 1.26 | 0.63 |

It is apparent from this table that the catalysts in accordance with the invention are more efficient than catalysts whose carriers contain only pure alumina, the final sulfur content of the hydrocarbon charge being reduced more effectively, under the same test conditions, by catalysts A to L.

The applicant has run further identical tests on commercial catalysts prepared by deposition of metals (nickel and/or molybdenum and/or cobalt) on alumina (impregnation with solutions of salts of these metals). Thus it has tested four commercial formulas whose characteristics are as follows:

Table 6

| Catalyst | CoO Wt. % | $MoO_3$ Wt. % | NiO Wt. % | As ($m^2$/g) | Vp (cc/g) |
|---|---|---|---|---|---|
| T3 | 4.6 | 15.2 | — | 260 | 0.45 |
| T4 | 4.2 | 11.5 | <0.01 | 284 | 0.55 |
| T5 | 3.2 | 13.5 | 0.07 | 227 | 0.50 |

Table 6-continued

| Catalyst | CoO Wt. % | MoO₃ Wt. % | NiO Wt. % | As (m²/g) | Vp (cc/g) |
|---|---|---|---|---|---|
| T6 | — | 17.5 | 2.4 | 142 | 0.44 |

The tests run on these catalytic formulas produced the following results:

Table 7

| Catalyst | GO charge Final sulfur wt. % | VGO charge Final sulfur, wt. % | | | |
|---|---|---|---|---|---|
| | | 300° C | 325° C | 350° C | 375° C |
| T3 | 0.05 | 1.91 | 1.37 | 0.84 | 0.36 |
| T4 | 0.06 | 2.08 | 1.54 | 1.01 | 0.45 |
| T5 | 0.06 | 2.09 | 1.52 | 0.98 | 0.49 |
| T6 | 0.13 | 2.26 | 1.74 | 1.22 | 0.63 |

Comprison of the results presented in the above table with those obtained with catalysts A to L in accordance with the invention shows that the latter are more effective, the percent of final sulfur being lower in most cases.

EXAMPLE 3

This example illustrates the use of catalysts in accordance with the invention in hydrodesulfurization, a test different from that described in Example 2 being performed.

The catalytic volume introduced into the reactor here is 160 cc, and the catalyst is in the form of extrudates 1.5 mm in diameter.

The operating conditions are as follows:
Pressure : 41 bars
Hydrogen-to-hydrocarbon ratio: 710 standard liters per liter This test was run on catalyst B described in Example 2, using as charge the vacuum distillate (VGO) with 2.83 wt. % of sulfur as well as three commercial catalysts (catalyst T3, described in the preceding example, and two other catalysts, T7 and T8, whose characteristics are given in Table 8).

Table 8

| Catalyst | CoO Wt. % | MoO₃ Wt. % | As (m²/g) | Vp (cc/g) |
|---|---|---|---|---|
| T7 | 2.8 | 14 | 215 | 0.40 |
| T8 | 5.4 | 11 | 94 | 0.33 |

The results obtained (final sulfur, wt. %) under different conditions of temperature and space velocity (vol.-/vol./hr.) are presented in Table 9.

Table 9

| Temperature | 350° C | 350° C | 380° C | 380° C | 380° C |
|---|---|---|---|---|---|
| Space velocity | 1 | 3 | 1 | 2 | 3 |
| B (Final sulfur, wt. %) | 0.19 | 0.45 | 0.04 | 0.09 | 0.21 |
| T3 (id.) | 0.35 | 0.76 | 0.08 | 0.19 | 0.29 |
| T7 (id.) | 0.37 | 0.79 | 0.085 | 0.21 | 0.32 |
| T8 (id.) | 0.385 | 0.81 | 0.091 | 0.22 | 0.33 |

I claim:

1. Process of preparation of a catalyst carrier precursor comprising the following principal steps:
    (a) hydrolysis of a solution of an organic aluminum salt in a first organic solvent by mixture with an aqueous solution of at least one water-soluble salt of at least one second metal selected from the group consisting of nickel, tungsten, molybdenum, and cobalt, producing a coprecipitated gel;
    (b) drying of the gel obtained between 70° and 140° C;
    (c) said gel, after drying, is steeped in a second organic solvent and then kneaded.

2. Process of preparation of a catalyst carrier comprising the following successive steps:
    (a) hydrolysis of a solution of an organic aluminum salt in a first organic solvent by mixture with an aqueous solution of at least one water-soluble salt of at least one metal selected from the group consisting of nickel, tungsten, molybdenum and cobalt, producing a coprecipitated gel;
    (b) drying of the gel obtained between 70° and 140° C;
    (c) steeping and then kneading the gel in a second organic solvent;
    (d) peptizating the gel with an acid solution, the amount of acid to be used being between 0.5 and 10% by weight of the dry gel;
    (e) eliminating said second organic solvent;
    (f) mechanical forming of the paste so obtained;
    (g) drying at between 70° and 140° C, and calcining at between 400° and 700° C.

3. Process according to claim 2, wherein the drying of the gel in step (b) is between 80° and 120° C.

4. Process according to claim 2, wherein the concentration of the organic aluminum salt in the organic solution is between 1 and 70 wt. % and the concentration of the water-soluble salt in the aqueous solution is comprised between $3 \times 10-2$ and 1 gram atom per liter.

5. Process according to claim 2, wherein the second metal content of said gel is between 0.1 and 20 wt. %, based on the total weight of the carrier.

6. Process according to claim 4, wherein the organic aluminum salt concentration is about 20 wt. %.

7. Process according to claim 5, wherein said hydrolysis is effected at between 0° and 50° C.

8. Process according to claim 7, wherein said hydrolysis is effected at ambient temperature.

9. Process according to claim 7, wherein said first and second organic solvents are liquid hydrocarbons.

10. Process according to claim 9, wherein said liquid hydrocarbons are selected from heptane and toluene.

11. Process according to claim 4, wherein said gel undergoes maturation for a duration of between 10 minutes and two days.

12. Process according to claim 2, wherein said mechanical forming consists of extrusion or granulation.

13. Process according to claim 4, wherein said gel after step (c) is moistened with water in a proportion up to 70% weight, based on the steeped and kneaded gel.

14. Process according to claim 4, further comprising after step (b), calcining the dried gel between 400° and 700° C.

15. Process according to claim 13, further comprising after step (b), calcining the dried gel between 400° and 700° C.

16. Catalyst carrier precursor prepared by the process comprised of the following principal steps:
    (a) hydrolysis of a solution of an organic aluminum salt in an organic solvent by mixture with an aqueous solution of at least one water-soluble salt of nickel, producing a coprecipitated gel;
    (b) drying of the gel obtained between 70° and 140° C.

17. Catalyst carrier precursor prepared by the process comprised of the following principal steps:
  (a) hydrolysis of a solution of an organic aluminum salt in an organic solvent by mixture with an aqueous solution of at least one water-soluble salt of tungsten, producing a coprecipitated gel;
  (b) drying of the gel obtained between 70° and 140° C.

18. A process according to claim 17, wherein the tungsten content of said gel is between 0.1 and 20%, based on the total mass of the carrier.

19. Process for the preparation of a catalyst carrier comprising calcining the catalyst carrier precursor prepared according to claim 16.

20. Process according to claim 19, wherein the concentration of the organic aluminum salt in the organic solution is between 1 and 70 wt. %.

21. Process according to claim 20, wherein the concentration of the water-soluble salt in the aqueous solution is comprised between $3 \times 10^{-2}$ and 1 gram atom per liter.

22. Process according to claim 21, wherein the organic aluminum salt concentration is about 20 wt. %.

23. Process according to claim 21, wherein said hydrolysis is effected at between 0° and 50° C.

24. Process according to claim 21, wherein said gel undergoes maturation for a duration of between 10 minutes and 2 days.

25. Process according to claim 19, wherein the drying of the gel is between 80° and 120° C.

26. Process for the preparation of a catalyst carrier comprising calcining the catalyst carrier precursor prepared according to claim 17.

27. Process according to claim 26, wherein the drying of the gel is between 80° and 120° C.

28. Process according to claim 26, wherein the concentration of the organic aluminum salt in the organic solution is between 1 and 70 wt. %.

29. Process according to claim 28, wherein the concentration of the water-soluble salt in the aqueous solution is comprised between $3 \times 10^{-2}$ and 1 gram atom per liter.

30. Process according to claim 29, wherein said hydrolysis is effected at between 0° and 50° C.

31. Process according to claim 29, wherein said hydrolysis is at ambient temperature.

32. Process according to claim 29, wherein said gel undergoes maturation for a duration of between 10 minutes and two days.

33. Process for the preparation of a catalyst carrier comprising calcining the catalyst carrier precursor prepared according to claim 1.

34. Process according to claim 33, wherein said first and second organic solvents are liquid hydrocarbons.

35. Process according to claim 34, wherein said first and second organic solvents are toluene or heptane.

36. Process according to claim 33, wherein the gel, steeped and kneaded is subjected to the following operations:
  (a) Peptizating with an acid solution, the amount of acid to be used being between 0.5 and 10% by weight of the dry gel;
  (b) Eliminating said second organic solvent,
  (c) Mechanical forming of the paste so obtained,
  (d) Drying at between 70° and 140° C, and calcination at between 400° and 700° C.

37. Process according to claim 36, wherein the peptization is with an acid solution of less than 5% by weight, and the calcination is at between 500° and 600° C.

38. Process according to claim 36, wherein said mechanical forming consists of extrusion or granulation.

39. Process according to claim 19, further comprising all calcinating of said gel being at between 400° and 700° C.

40. Catalyst carrier precursor prepared by the process comprised of the following principal steps:
  (a) hydrolysis of a solution of an organic aluminum salt in an organic solvent by mixture with an aqueous solution of at least one water-soluble salt of cobalt, producing a coprecipitated gel;
  (b) drying of the gel obtained between 70° and 140° C.

41. Process according to claim 40, wherein the drying of the gel is between 80° and 120° C.

42. Process according to claim 40, wherein the concentration of the organic aluminum salt in the organic solution is between 1 and 70 wt. %.

43. Process according to claim 42, wherein the concentration of the water-soluble salt in the aqueous solution is comprised between $3 \times 10^{-2}$ and 1 gram atom per liter.

44. A process according to claim 40, wherein the cobalt content of said gel is between 0.1 and 20%, based on the total mass of the carrier.

45. Process according to claim 43, wherein the organic aluminum salt concentration is about 20 wt. %.

46. Process according to claim 43, wherein said gel undergoes maturation for a duration of between 10 minutes and 2 days.

47. A process according to claim 16, wherein the nickel content of said gel is between 0.1 and 20%, based on the total mass of the carrier.

48. Process according to claim 36, wherein said gel after step (c) is moistened with water in a proportion up to 70% weight, based on the steeped and kneaded gel.

49. Process for the preparation of a catalyst carrier comprising calcining the catalyst carrier precursor prepared according to claim 40.

50. Process according to claim 29, wherein the organic aluminum salt concentration is about 20 wt. %.

51. Process according to claim 26 further comprising all calcining of said gel being at between 400° and 700° C.

52. Process according to claim 49, further comprising all calcining of said gel being at between 400° and 700° C.

53. Process according to claim 47, further comprising all calcination of said gel being at between 400° and 700° C.

54. A process according to claim 33, wherein the second metal content of said gel is between 0.1 and 20%, based on the total mass of the carrier.

* * * * *

UNITED STATES PATENT AND TRADEMARK OFFICE
CERTIFICATE OF CORRECTION

PATENT NO. : 4,097,412
DATED : June 27, 1978
INVENTOR(S) : Alain Muller

It is certified that error appears in the above-identified patent and that said Letters Patent are hereby corrected as shown below:

Patent Claim 7, column 10, line 39, replace "5" by --4--;

Patent Claim 36, column 11, line 60, replace "(a)" by --(a')--;

"   "   "   column 12, line 1, replace "(b)" by --(b')--;

"   "   "   "   "   line 2, replace "(c)" by --(c')--'

"   "   "   "   "   line 3, replace "(d)" by --(d')--.

Signed and Sealed this

Sixteenth Day of January 1979

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,097,412
DATED : June 27, 1978
INVENTOR(S) : Alain Muller

It is certified that error appears in the above–identified patent and that said Letters Patent are hereby corrected as shown below:

Claims 18 and 41 to 47, replace "process" by --precursor--.

Signed and Sealed this

Twenty-eighth Day of October 1980

[SEAL]

Attest:

SIDNEY A. DIAMOND

Attesting Officer

Commissioner of Patents and Trademarks